358-69. OR 2,989,585 SR
T6532
SEARCH ROOM
June 20, 1961 F. SCHRÖTER 2,989,585
TELEVISION ERROR COMPENSATION
Filed April 4, 1958
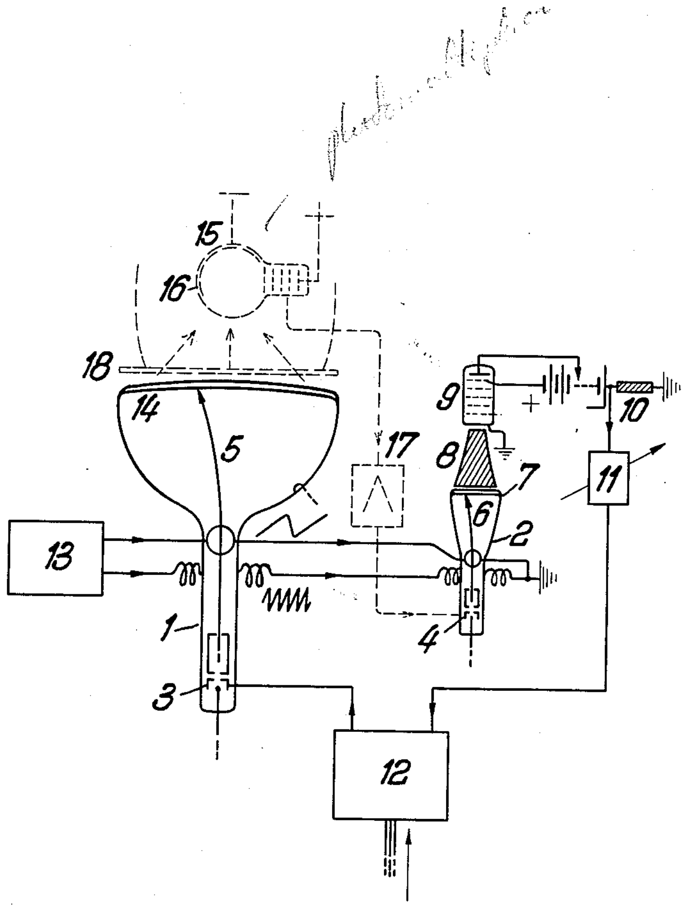
Inventor:
FRITZ SCHRÖTER
By: Eric H. Frankel
PATENT AGENT 2,989,585
TELEVISION ERROR COMPENSATION
Fritz Schröter, Neu-Ulm, Danube, Germany, assignor to Telefunken G.m.b.H., Berlin, Germany
Filed Apr. 4, 1958, Ser. No. 726,476
Claims priority, application Germany Apr. 9, 1957
8 Claims. (Cl. 178—5.4)

The invention relates to color television systems and to a method of operating the same, wherein the television screen comprises narrow luminescent strips of the basic colors, said strips cyclically alternating in their colors.

It has been difficult in known color television tubes of this type to avoid distortion of the transmitted color shade due to non-linearity of the sweep deflection, requiring considerable complication and expense in tubes and circuit components to avoid. This is due to the fact that a raster comprising narrow phosphorus strips alternately repeating in both color and geometric location during the operation of the tube and controlled by means of three color signals available at the output of the receiver, requires accurate synchronizing at all points of the picture between the phase of the control signal and the sweep of the cathode ray beam in the direction of the strips in such a manner that during the scanning of the red color component the beam remains on a red luminescent phosphorus strip, and the same is true for the two other color signals and their respective phosphorus strips. If this condition is not fulfilled due to lack of linearity and synchronizing in the repetition sequence of the controlling color signals, which condition is brought about by a phase difference between the sequence of the color signals on the one hand and the illumination of the assigned phosphorus strips caused by the impinging beams on the other hand, distortion of the color value and of the local brightness will occur. Since a non-linearity of the line deflection will generally be present, compensation of both color and distortion influence is absolutely necessary. All of the known proposals to solve this problem entail undue complication in components and tubes in the receiving apparatus and do not operate reliably due to their sensitivity to the amplitude of the color signal. In addition to this, these known proposals involve considerable structural complication in the design of the color television tube and result in reduced color fidelity and image definition.

It is an object of the present invention to overcome these disadvantages and to considerably decrease the complexity of control of the phase and coincidence of the color signal and color strips.

It is another object of the invention to provide an auxiliary cathode ray tube which creates compensating signals by means of a transparency arranged in front of the screen of this tube and carrying a pattern, whereby these optical signals are converted into electrical signals acting on the received color signal sequence at the control electrode of the electron gun of the color picture tube, and whereby the pulses have such sequence that the luminescent strips are excited in the color picture tube in proper phase relation.

It is another object of the invention to provide in the receiver an auxiliary cathode ray tube having a gun delivering an independent beam which, when acted upon by the same sawtooth deflecting sweep as the color picture tube beam, moves in step with this beam on each line sweep: i.e. point by point through a synchronous and equal trace. This beam and auxiliary tube do not serve directly to reproduce the transmitted color image, they rather serve the purpose of compensating for the non-linearity of the horizontal line deflection independent of the picture signal without complicating the design of the color picture tube. Suitably, the same provision may be made also for the vertical deflection which is perpendicular to the line direction. Due to the fact that the auxiliary beam on the screen of its tube crosses certain signal initiating spots corresponding respectively to certain color strips of the luminescent raster of the color picture tube contacted at the same instant, an oscillating circuit is energized via these spots, said circuit controlling as a function of its frequency the phasing of the appearance of the color control signals from the respective outputs of the receiver to the beam of the picture tube, said appearances occurring in sequence one after the other. The control signal may, for example, be applied to a transit time circuit, so that the color signals act on the control electrode of the picture tube in the proper sequence via thyratrons. It will be assumed in the following for the sake of clarity, without limiting the invention to this example, that the receiver has three separate outputs supplying in sequence control voltages for determining the beam current intensity for illuminating three kinds of phosphorus strips, red, green and blue, so that the image will be readily produced in proper colors and with proper luminescence.

It is a still further object of the invention to carry out a forming process prior to the actual use of the color picture tube during the manufacture of the apparatus, by means of the special auxiliary cathode ray tube whereby the color picture tube transmits the non-linear geometry of the sweep and raster sequence of its line movement to a coating over the screen of the auxiliary cathode ray tube. The mentioned light spots used for the color production after suitable setting of the proper phase control will then be primarily photographically produced on a correcting transparency coating, said light spots serving during the subsequent use of the apparatus the opposite purpose of altering the phase of the color signals to the cathode beam of the color picture tube in proper phase with respect to the phosphorus strips of different emission color.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The drawing shows schematically an embodiment of the apparatus according to the invention.

A color picture tube 1 is provided for reproducing a picture at a receiver. An auxiliary tube 2 in the form of a small cathode ray oscillograph is associated with the color picture tube 1, whereby the same voltages necessary for operating the color picture tube are applied to this small cathode ray tube.

The color picture tube 1 has only a single electron gun having an intensity control electrode 3. A corresponding control electrode 4 is included in the auxiliary tube 2. 5 denotes the deflected beam in the color picture tube 1, while 6 indicates the corresponding beam in the auxiliary tube 2 which is synchronously deflected with the beam 5. The latter tube has a screen 7, the lighted pattern of which can pass through a cone 8 of glass or plastic, acting as an optical collecting means and concentrating the light by total reflection within the cone on the photo-cathode of a photoelectron multiplier 9 with minimum losses. A compensating signal appearing across an output resistance 10 of this multiplier is fed to a mixer 12 after passing through an amplifier and phase adjusting circuit 11, whereby in the mixer 12 the compensating signal can control the phase position of the color signals 22 for suitable reproduction in the picture tube 1. This can be accomplished in one of several known ways not specifically described herein. A deflection generator 13 according to the invention sweeps the two tubes 1 and 2, wherein the horizontal line deflection fields and also the vertical deflection fields acting mutually perpendicularly are energized by series circuits by a magnetizing sawtooth current. If the deflection systems of the two tubes 1 and 2 are matched to each other and dimensioned in such a manner that the magnetic fields are substantially similar to each other, the sweep movement of the beams 5 and 6 will be congruent to a great extent with respect to the relative geometry of these tubes. In the drawing, the horizontal sweep of the beams 5 and 6 will be perpendicular with respect to the plane of the drawing, while the vertical deflection takes place in the plane of the drawing.

The screen 14 of the picture tube 1 comprises a plurality of very narrow phosphorus strips of alternating repeating emission colors, red, green, blue, wherein these strips are perpendicular with respect to the standard line deflection. In contrast to this, the screen 7 of the auxiliary tube 2 is entirely different. This screen is provided within the tube 2 and is made up of a uniformly luminescent layer of short persistence, for example, of calcium tungstate or of zinc oxide.

A photographic coating is applied to the front face of the envelope of the tube 2 in direct contact therewith, said coating being adapted to be photographically exposed and then developed so that the light pattern thereon can be fixed. A conventional photographic film is suitable for this purpose, whereby a positive is made therefrom and is secured on the envelope face in front of the luminescent layer 7. Obviously, the negative of a film may also be used as the correcting transparency. In this case, correcting signals are obtained with the opposite polarities during the operation of the apparatus, which is not important to the functioning thereof. In place of a film, a metal foil coated with chrome-gelatin may be used. Chrome-gelatin becomes insoluble at locations where it is exposed and serves in a manner known per se to transfer a copy of the raster geometry of the tube 1 to the foil. For this purpose, methods known in the printing art may be used. In this way, the correcting transparency serves during the subsequent use of the apparatus for correction of the phase synchronization in the tube 1, said transparency being mounted on the front face of the tube 2, and produces the mentioned synchronizing signals through the multiplier 9. If, during its isochronous deflection with respect to the beam 5, the beam 6 impinges upon the screen 7, the multiplier 9 produces electron pulses which are synchronous and in proper phase to generate the same kind of luminescence in the tube 1.

If the chrome-gelatin method is used, a grid of fine metal strips is obtained after washing off the gelatin not fixed by the light, and after etching the metal at the exposed intermediate spaces, whereby the light of the screen 7 can pass between these fine metal strips to the photocathode of the multiplier 9. In contrast to this, the remaining metal strips mask the light. The signal from the multiplier 9 will then disappear and the resulting negative pulse, if properly applied, can initiate in the mixer 12 a control action for use in correcting the color tube. It is also possible to blank the electron beam of the auxiliary cathode ray tube by means of the pulses fed by the photo current multiplier. This has an influence on the final result only to the extent that at the one instant, negative, and at the other instant positive control pulses are obtained.

The means for creating the correcting transparency are not components of the finished receiver and are indicated in the drawing by dotted lines. These components comprise a photo current multiplier 15 having a photocathode 16 creating an output signal via an amplifier 17, and further comprise a grid electrode 4 in the auxiliary tube 2. The beam 6 is unblanked by the pulse produced by the multiplier 15, so that this beam photographically produces at particular points the intensity spots for the subsequent control of the mixer 12. A color filter 18 is inserted in front of the tube 1. Assuming that this filter 18 is a red filter and that the color picture tube 1 is operated at a constant beam current intensity so that it will display its sweep pattern under the control of deflection fields, the multiplier 15 will obtain light only when the beam 5 passes along red-emitting phosphorous strips. The green and blue emission produced by the intermediate phosphorus strips are absorbed by this filter 18. Thus, the control grid electrode 4 of the auxiliary tube 2 will receive unblanking signals from the output of the multiplier 15 only during the instants at which red-emitting phosphorus strips are excited within the tube 1. Accordingly, the pattern of the red-emitting phosphorus strips will photographically appear on the transparency in front of the screen of the auxiliary tube 2 after a sufficient illumination period. Consequently, independent of the various non-linearities of the sweep deflection in the tubes 1 and 2, the instants of the energization of the red luminescing strips within the tube 1 will coincide with the instants at which the beam 6 leaves its photographic trace on the correcting transparency. After development and correct affixing of the transparency to the face of the screen 7 of the auxiliary tube 2, the latter can serve in conjunction with the multiplier 9 as a photoelectrical corrector of the phasing of the three kinds of phosphorus within the tube 1, when the receiver is in use. The correcting signal produced in the multiplier 9 exhibits small variations which, being the result of the non-linearity of the line deflection, can upon modulation with the color signal sequence of the receiver, control the grid electrode in the picture tube 1, determining its phase. It is advisable to first multiply this correcting signal and to make the multiplied signal act upon the phase and the sequence of the connection of electrode 3 to the color signal output of the receiver. The circuit components necessary for these operations are provided in the mixer 12.

By fulfilling the requirements mentioned in the foregoing for synchronizing the red color signal component during the excitation of the red luminescing phosphorus strips, it automatically follows that the same synchronization is obtained for the green and blue color components.

The principle of the present invention, i.e., the production and application of a correcting pattern derived from the scanning pattern of the luminous phosphorus layer within an auxiliary cathode ray tube which is connected in parallel with and synchronized to the color picture tube, whereby the color signal and the excitation of the luminous layer assigned to this color signal are maintained in phase coincidence, can also be applied to rasters employing different types of luminous layers within a color picture tube. For example, it may be applied to rasters based on phosphorus strips which are parallel to the line deflection or screens in the form of color spot mosaics as used in the so-called "shadow mask" color television tube of the Radio Corporation of America. In this kind of tube, luminescent phosphorus spots of the different emissive colors are used having extremely small dimensions. In applying the present invention, color filter of a certain kind can be used in making correcting transparency from the color tube in exactly the same manner as described in the foregoing. However, it appears that the inventive method can be carried out most simply when the phosphorus strips are provided approximately in vertical position.

I claim:

1. In a color television system having a picture tube including a screen divided into discrete alternately arranged color areas and including a control electrode to which picture signals are applied and sweep means for deflecting the beam of the tube to form a picture raster, the screen when swept by the beam showing errors of uniformity, means for compensating said errors comprising an auxiliary cathode ray tube having a screen and having an auxiliary beam deflected by said sweep means in unison with said picture tube beam and producing on said screen a moving spot of brief persistence; a transparency overlying the screen of the auxiliary tube and having thereon a pattern corresponding with the intensity distribution of said raster when scanned with a beam of constant intensity; light sensitive means for translating the spot intensity as viewed through the transparency into electrical correcting signals; and mixer means for applying the correcting signals to the picture signals in such a phase relation as to compensate said errors.

2. In a system as set forth in claim 1, said discrete color areas comprising series of long narrow strips sequentially arranged on the screen normal to the direction of the line sweep.

3. In a system as set forth in claim 1, said sweep means delivering vertical and horizontal deflection waves; and said tubes having matched deflection elements driven simultaneously by the same waves.

4. In a system as set forth in claim 1, means for making said transparency comprising light sensitive pick-up means opposite said picture screen and connected to a beam intensity control element in said auxiliary tube; a photosensitive layer overlying the screen of the auxiliary tube and means for sweeping said beams over the raster in unison with the intensity of the picture tube beam maintained constant, whereby the pattern recorded on said layer will be representative of the pattern traced on the picture tube screen.

5. In a system as set forth in claim 4, a color filter interposed between the pick-up means and the picture screen whereby the recorded pattern represents only the raster pattern for one color emission.

6. In a system set forth in claim 4, said layer comprising a photographic film.

7. In a system as set forth in claim 4, said layer comprising a screen containing material adapted to be hardened by exposure to the light of said spot, the non-hardened material being separately removable.

8. In a system as set forth in claim 1, said light sensitive means comprising a photo-electron multiplier.

References Cited in the file of this patent

UNITED STATES PATENTS

| | | |
|---|---|---|
| 2,622,147 | Condliffe | Dec. 16, 1952 |
| 2,721,895 | Spracklen | Oct. 25, 1955 |
| 2,736,764 | Bingley | Feb. 28, 1956 |
| 2,779,819 | Graham et al. | Jan. 29, 1957 |